C. GOODYEAR.
Corrugated India Rubber Goods.
No. 3,461.  Patented Mar. 9, 1844.
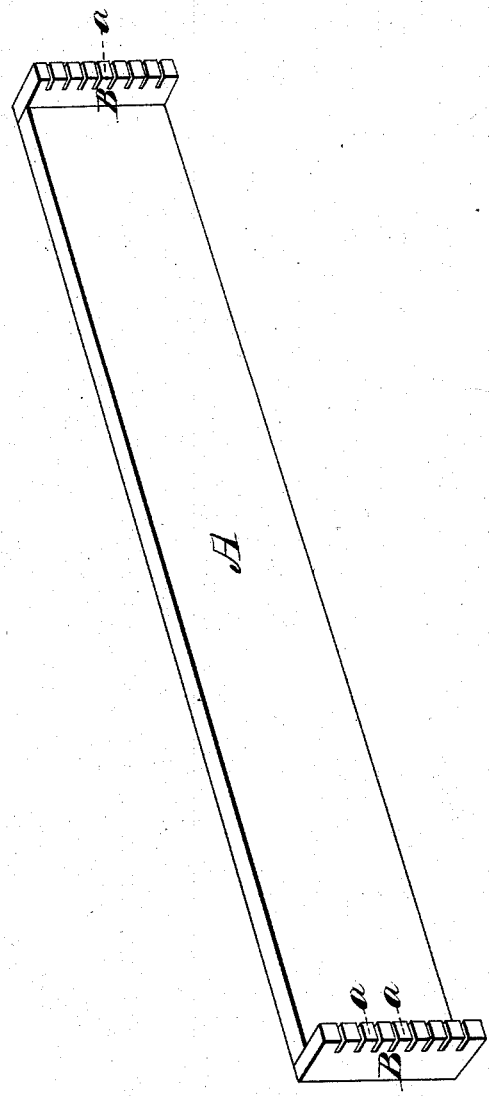

UNITED STATES PATENT OFFICE.

CHARLES GOODYEAR, OF NEW YORK, N. Y.

INDIA-RUBBER FABRIC.

Specification of Letters Patent No. 3,461, dated March 9, 1844.

*To all whom it may concern:*

Be it known that I, CHARLES GOODYEAR, of the city of New York, in the State of New York, have invented a new and useful Manufacture of Goods which I denominate "Corrugated or Shirred India-Rubber Goods;" and I do hereby declare that the following is a full and exact description thereof.

The goods manufactured by me under the name of corrugated, or shirred, india-rubber, are formed by cutting sheet india-rubber into narrow strips, or threads, say of one-eighth, or one-sixteenth of an inch, more or less, in width; and, usually, of about the thickness of a card. These strips are then stretched upon a suitable board, or table, in such manner as that they may pass back and forth parallel to each other, say at the distance apart of one fourth of an inch, more or less. The table, or board, is provided with pins, or notches, at each end; and around these pins, or through the notches, the threads are to be stretched as they are passed back and forth; the stretching of these strips may amount to twice, more or less, of their quiescent length. While so stretched, two laminæ of cloth, or of other suitable material, of the requisite width and length, which are covered on one side with moist india-rubber cement, are to be placed one on either side of the stretched threads, the cemented sides being toward said threads; these laminæ are to be brought into contact with each other between the threads, which may be readily done by passing a smooth piece of metal, ivory, or other article, along the side of each of the threads. I have, however, invented a machine for effecting this object, which will greatly facilitate the process, and for the construction and use of which I am about to apply for Letters Patent.

I do not restrict myself to the use of any particular material which is to constitute the laminæ with which the elastic threads are to be covered, but employ any such as may be adapted to the purpose to which the corrugated material is to be applied. One side, for example, may consist of thin leather, and the other of cotton, or other cloth. In the manufacturing of suspenders, I have sometimes taken silk ribbon for one of the laminæ, and cotton cloth for the other; but, in general, a material of much greater width than ribbon will be used, and the article, when dry, cut into strips of such width, or into such other forms, as may be required.

Although I do not intend in this specification to claim any particular apparatus to be used in the manufacturing of the corrugated goods, but to limit my claim to the article in its manufactured state, by whatever process it may be made, as being itself entirely new, I have, in the accompanying drawing, shown a board, or table, such as I have used, particularly in the making of suspenders from ribbon.

A, is a board of the requisite length; B, B, ledges at its ends, and a, a, a, notches in said ledges, through which the india-rubber thread is to be passed in a stretched state, so as to stand in parallel lines, as above set forth. When the material thus formed is removed from the board, or machine, on which it is made, it will, by the contraction of the stretched threads of india-rubber, become corrugated, so as to form distinct plaits between them, and although the same amount of contraction takes place upon the threads themselves, this part will be comparatively smooth, and the whole will prevent a corded appearance which is in itself neat, and the fabric will possess a degree of elasticity limited only by the cotton, silk, or other nonelastic material, which constitutes one, or both, of the laminæ.

Having, for the purpose of putting the public in possession of my invention, fully described the nature of my new manufacture of corrugated goods, and having, also, set forth the manner in which I have manufactured the same, what I claim as new therein, and desire to secure by Letters Patent, is—

The forming of such goods, by the stretching of strips, or threads, of india-rubber to such extent as may be desired, and the covering the said strips, or threads, on opposite sides, with laminæ of cloth, leather, or any other suitable material; which laminæ are to be united to each other, and to the threads, or strips, by means of india-rubber cement; the same being effected so as to produce a manufactured article substantially such as is herein set forth and made known.

CHARLES GOODYEAR.

Witnesses:
THOS. P. JONES,
R. K. MORSELL.